No. 609,542. Patented Aug. 23, 1898.
G. HAYES.
WHEEL FOR BICYCLES.
(Application filed Nov. 6, 1897.)

(No Model.) 2 Sheets—Sheet 1.

Witnesses
Harry J. Black.
Arthur Hayes.

Inventor
Geo Hayes.

No. 609,542. Patented Aug. 23, 1898.
G. HAYES.
WHEEL FOR BICYCLES.
(Application filed Nov. 6, 1897.)

(No Model.) 2 Sheets—Sheet 2.

Witnesses:
Harry D. Black.
Arthur Hayes.

Inventor:
Geo. Hayes.

UNITED STATES PATENT OFFICE.

GEORGE HAYES, OF NEW YORK, N. Y.

WHEEL FOR BICYCLES.

SPECIFICATION forming part of Letters Patent No. 609,542, dated August 23, 1898.

Application filed November 6, 1897. Serial No. 657,654. (No model.)

*To all whom it may concern:*

Be it known that I, GEORGE HAYES, a citizen of the United States, and a resident of the city, county, and State of New York, have invented certain Improvements in Wheels for Bicycles and other Vehicles, of which the following is a specification.

My improvement relates to the central portion of the wheel; and it consists in a construction wherein an axle-hub is resiliently supported centrally within an encircling spoke-nave by a series of cylindrically-coiled springs arranged parallel to the axle-hub and united by connections integral therewith, the entire series being essentially one continuous length of metal.

It further consists of such combinations, modifications, and devices as are hereinafter more fully described, and pointed out in the claims, reference being had to the accompanying drawings, in which—

Figure 1 represents a cross-section of an axle-hub with inside face of end flange and spoke-nave, also with a series of several coiled springs and connecting stretches all continuous. Fig. 2 represents a view of the axle-hub transversely to that of Fig. 1, partly in section. Fig. 3 is view of one of the cross-rods or spindles which serve to connect the two end cheeks or disks of the spoke-nave and each of which carry a coiled spring formed as a cylindrical spiral and sleeved thereupon. Fig. 4 represents a view of a free spindle, which also in use carries a coiled spring, but is otherwise disengaged. Fig. 5 represents a double-shouldered washer used to divide coiled springs upon spindles when a double system of springs are used, as in Fig. 2. Fig. 6 represents a view corresponding to that of Fig. 1, but showing a series comprising several sets of the springs distributed around the axle-hub. Fig. 7 represents a view corresponding to that of Fig. 2, except that the several sets of springs in the series are united by spring-braces. Fig. 8 represents a coiled spring upon spindle shown as tapering instead of cylindrical. Fig. 9 represents one of the braces of Fig. 7 alone.

On the drawings, A indicates the axle-hub, which may be constructed after any of the usual ball-bearing styles, excepting that a wide flange at each end is required, as at A', either as a part thereof or added, and between which, secured thereto, extend spindles at $A^2$, like those shown in Fig. 3, carrying coiled springs.

B indicates the cheeks or end disks of the spoke-nave, held at the proper distance apart by spindles, as at B', secured thereto and carrying coiled springs.

C indicates certain spindles not connected to either the spoke-nave or axle-hub. They also carry coiled springs. The coiled springs upon the several spindles are connected after the manner shown in Figs. 1, 2, 6, 7, and 10 at C' by stretches of the metal integral with the coils which they connect, so that all the springs of a set are as one piece, though not necessarily in one piece, as joining may be made in one of the midway spirals of a coil by abutting ends united or not. The connecting stretching wires extend from one end of a coil in one direction and from the other end of a coil in another direction, and so on, alternating from side to side. The coiled springs may extend the full interior width of the axle-hub and spoke-nave, or two sets may be used, one for each half, as in Figs. 2 and 8, which latter form is the preferable one.

It will readily be seen that all the connections of the system with the axle-hub are flexible and no rigid connections of the springs are found anywhere. Consequently every movement of the axle-hub vibrates the entire series of springs, whether formed in several sets, like Figs. 6 and 7, or as one set, like Figs. 1 and 10.

The spindles are provided with loose washers shouldered like those at D, Fig. 3, and when desirable those of Fig. 5 are also added between divided springs, as in Fig. 2. None of the latter are required where tapering coils are used like those of Fig. 8. The springs are all under tension, and in all the coils the effect of the vibration is to tighten the coil and effect a reaction.

In cross-section the metal of the springs and connecting stretches may be round or rectangular, as desired, the round form being deemed preferable. The spirals of the coils are not closely wound together, but sufficient space is provided to permit of the tightening movement, and the shoulders of the washers D sustain the ends of the coils, leaving space around the spindles inside the coil for movement.

Fig. 7 shows an addition of braces E, whereby the several sets may be connected.

Figure 1:
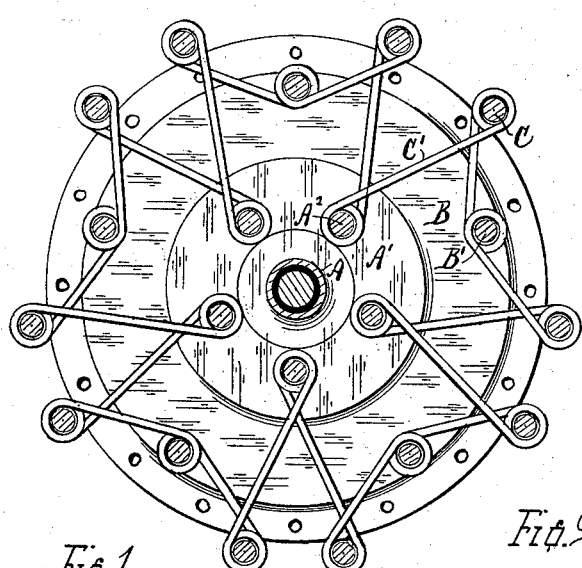
Figure 2:
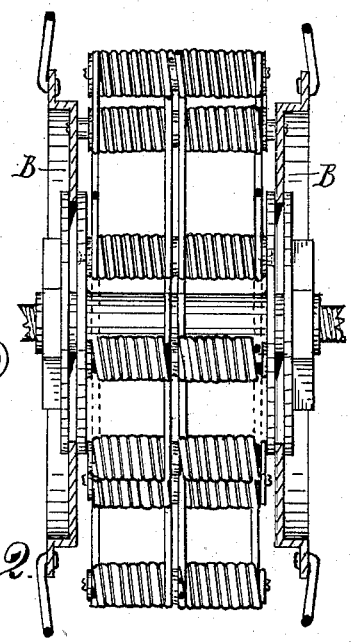
Figure 3:
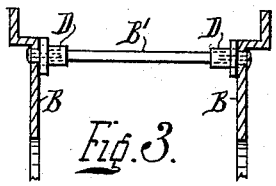
Figure 4:
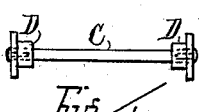
Figure 5:
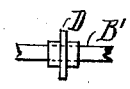
Figure 6:
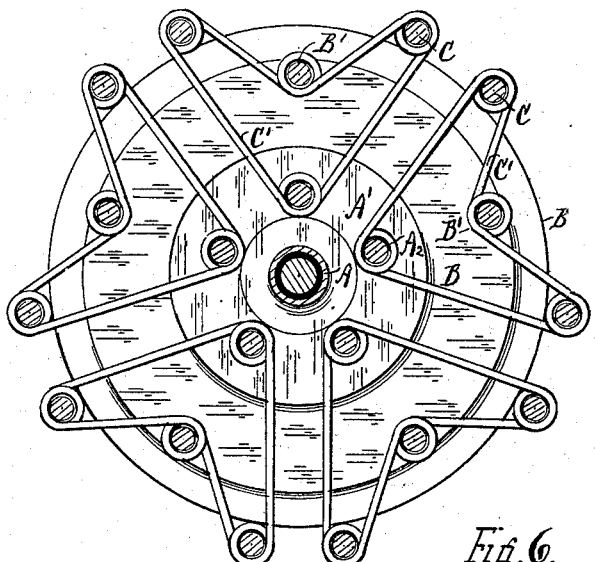
Figs. 6 and 7 show the coils and connections arranged in separate sets.
Figure 7:
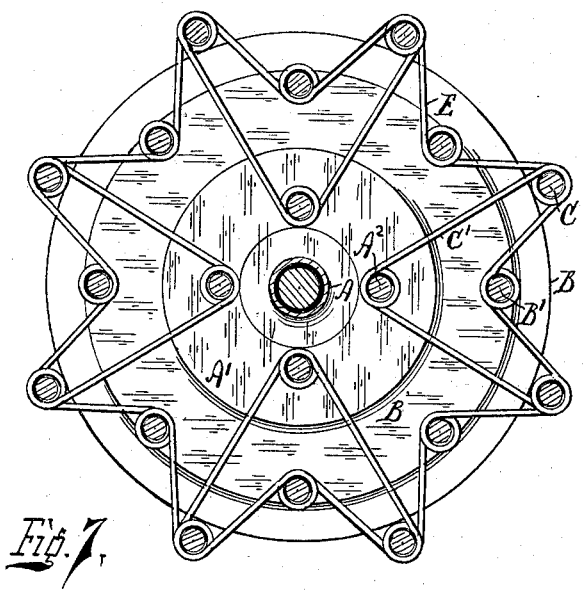
Figure 8:
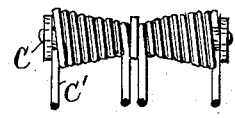
Figure 9:
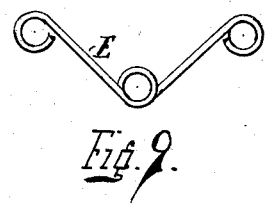
Fig. 9 shows one of the braces E alone.

What I claim as new, and desire to secure by Letters Patent, is—

1. In a wheel for bicycles and other vehicles, an axle-hub provided with a set of spindles arranged parallel thereto, at intervals around the same, a spoke-nave encircling the axle-hub and provided with a set of spindles arranged parallel to the hub, a set of free spindles also parallel to the axle-hub, and upon the aforesaid spindles, cylindrical coils of spring metal, the several coils all being connected, essentially as set forth.

2. In a wheel for bicycles and other vehicles, an axle-hub resiliently suspended within an encircling spoke-nave, the points of suspension being cone spirals, essentially as set forth.

3. In a wheel for bicycles and other vehicles, an axle-hub sustained centrally within an encircling spoke-nave by suspensory springs formed as radiating arms terminating in coils, and which extending beyond the periphery of the spoke-nave, are connected therewith by arms finishing in coils, essentially as set forth.

4. In a wheel for bicycles and other vehicles, a system of springs between an axle-hub and encircling spoke-nave, formed as radiating arms connected at their bases by coiled springs, each to its contiguous neighbor, and at their outermost extremity each arm terminating in a coil, from which depend arms arranged anglewise, and also forming an angle at their meeting-point where connected to the spoke-nave, then uniting in a coil, essentially as set forth.

5. In a wheel for bicycles and other vehicles, a system of spirally-coiled metal springs, each of tubular shape and each encircling a spindle, the springs connected by straight continuations or stretches of the metal, and the whole system connected to an axle-hub and an encircling spoke-nave to provide for elasticity and resiliency, essentially as set forth.

GEO. HAYES.

Witnesses:
JAMES R. MCAFEE,
HARRY I. BLACK.